United States Patent
Cheng et al.

(10) Patent No.: US 7,540,648 B2
(45) Date of Patent: Jun. 2, 2009

(54) DIFFUSION PLATE ASSEMBLY

(75) Inventors: Wen-Feng Cheng, Taoyuan County (TW); Chen-Sheng Lee, Taoyuan County (TW); Chao-Ying Lin, Taoyuan County (TW)

(73) Assignee: Entire Technology Co., Ltd., Taoyuan County (TW)

( * ) Notice: Subject to any disclaimer, the term of this patent is extended or adjusted under 35 U.S.C. 154(b) by 152 days.

(21) Appl. No.: 11/772,000

(22) Filed: Jun. 29, 2007

(65) Prior Publication Data
US 2009/0002600 A1    Jan. 1, 2009

(51) Int. Cl.
   *F21V 7/04*    (2006.01)
(52) U.S. Cl. .................. 362/607; 362/97; 362/612
(58) Field of Classification Search .......... 362/607, 362/97, 612, 331; 349/112, 63–64
   See application file for complete search history.

(56) References Cited

U.S. PATENT DOCUMENTS

| | | | |
|---|---|---|---|
| 5,046,826 A * | 9/1991 | Iwamoto et al. ............... | 349/65 |
| 5,384,658 A * | 1/1995 | Ohtake et al. ............... | 359/707 |
| 5,718,497 A * | 2/1998 | Yokoyama et al. .......... | 362/625 |
| 7,111,974 B2 * | 9/2006 | Mizutani et al. ............ | 362/607 |
| 7,338,184 B2 * | 3/2008 | Chen et al. .................. | 362/246 |
| 2005/0135118 A1* | 6/2005 | Takata ........................ | 362/615 |
| 2007/0014034 A1* | 1/2007 | Lee et al. ..................... | 359/707 |

\* cited by examiner

*Primary Examiner*—Ali Alavi
(74) *Attorney, Agent, or Firm*—Alan Kamrath; Kamrath & Associates PA

(57) ABSTRACT

A diffusion-plates assembly and a direct-type backlight module assembly are provided. The diffusion-plates assembly includes a first diffusion plate and a second diffusion plate. There are pluralities of first microstructures on the emergent surface of the first diffusion plate, the first microstructures is for condensing light. The thickness of the first diffusion plate is above 0.4 mm, and the transmittance of the first diffusion plate is above 90%. The second diffusion plate is placed over or under the first diffusion plate, The thickness of the second diffusion plate is above 0.4 mm, and the transmittance of the second diffusion plate is 50☐~90☐. Said diffusion-plates assembly is used in the direct-type backlight module assembly.

22 Claims, 8 Drawing Sheets

DIFFUSION PLATE ASSEMBLY

BACKGROUND OF THE INVENTION

1. Field of the Invention

The present invention relates to an optical diffusion plate; particularly to a diffusion plate assembly with multiple microstructures thereon.

2. Description of the Prior Art

In recent times, a conventional cathode ray tube display apparatus is gradually replaced by the liquid crystal display apparatus, mainly due to the fact that the manufacturing cost of a liquid crystal display apparatus is remarkably reduced and a liquid crystal display apparatus emits lower radiation than a conventional cathode ray tube apparatus. In general, a liquid crystal display apparatus includes a backlight module assembly and a liquid crystal panel. The backlight module assembly is used to provide light for the liquid crystal display.

FIG. 1 shows a conventional backlight module assembly, the backlight module assembly 100 is comprised of cold cathode fluorescent lamps 110, a reflector 120, a diffusion plate 130 and pluralities of optical films 140. The cold cathode fluorescent lamp 110 is used to provide the light. The reflector guides the light, emitted from the spaced cold cathode fluorescent lamps 110, to the diffusion plate 130. The optical films 140 include a diffusion film 142 and a brightness enhancement film 144. In order to solve the problem of non-uniformity in brightness on the displaying surface of the liquid crystal panel, the diffusion plate 130 is placed to diffuse the light, emitted from the cold cathode fluorescent lamps 110, therefore providing a more uniform light emergence to the liquid crystal panel (not shown). Further, since pluralities of diffusion particles are disposed in the diffusion plate 130, the transmittance of the diffusion plate 130 is lowered. In general, the transmittance of the diffusion plate 130 is between 50% and 70%.

However, the problem in non-uniformity in brightness cannot be completely solved only by disposing the diffusion plate 130; therefore placing the diffusion film 142 on the diffusion plate 130 is necessary. Since the angle of light emergence is larger from the diffusion film 142, it is necessary to add the brightness enhancement film 144 on the diffusion film 142. The brightness enhancement film 144 is approximately between 0.062 mm and 0.375 mm. There are pluralities of prism-shaped structures 144a on the brightness enhancement film 144. The prism-shaped structures 144a can reduce the angle of the light emergence, so the brightness enhancement film 144 is able to condense the light, and the brightness can be enhanced in the viewing angle.

In general, compared to other elements in a backlight module assembly, the brightness enhancement film 144 is the most expensive. In order to reduce the whole cost of the backlight module assembly 100, the present invention aims to sustain the brightness even without the brightness enhancement film 144.

SUMMARY OF THE INVENTION

In order to reduce the cost of the backlight module assembly, the present invention aims to provide a diffusion plate assembly which will allow a backlight module assembly to exclude the need for a brightness enhancement film, so the cost of the backlight module assembly can be reduced.

Another objective of the invention is to provide a direct-type backlight module assembly that has said diffusion plate assembly. The addition of the diffusion plate assembly allows the direct-type backlight module assembly to exclude the brightness enhancement film, the cost of the direct-type backlight module assembly can be reduced.

To achieve the foregoing objectives, the present invention of a diffusion plate assembly includes: a first diffusion plate and a second diffusion plate. The first diffusion plate has pluralities of first microstructures on its emergent surface, the first microstructures are for condensing light, the thickness of the first diffusion plate is 0.4 mm~2 mm, and the transmittance of the first diffusion plate is above 90%. The second diffusion plate is placed over or under the first diffusion plate, the thickness of the second diffusion plate is 0.4 mm~2 mm, and the transmittance of the second diffusion plate is between 50% and 90%.

In the present diffusion plate assembly, the first microstructures are prism-shaped structures. The height of the first microstructures is between 25 μm and 200 μm, and the distance between the peaks of each first microstructure is between 50 μm and 300 μm.

In the present diffusion plate assembly, the transmittance of the first diffusion plate is preferred above 95%, and the transmittance of the second diffusion plate is preferred between 50% and 55%.

In the present diffusion plate assembly, the thickness of the first diffusion plate is between 0.4 mm and 2 mm, and preferred at 0.6 mm. The thickness of the second diffusion plate is between 0.4 mm and 2 mm, and preferred at 1.5 mm.

The first diffusion plate and the second diffusion plate are comprised of transparent material doped with pluralities of optical diffusion particles. The transparent material is selected from the group consisting of Polymethy Methacrylane, Polycarbonate, Polystyrene, (Methyl Methacrylate) Styrene, Polypropane, Polyethylene, and Polyethylene terephthalate.

In the present diffusion plate assembly, pluralities of second microstructures are disposed on the incident surface of the first diffusion plate, and the arrangement direction of the second microstructures is perpendicular the first microstructures.

In the present diffusion plate assembly, pluralities of third microstructures are disposed on the emergent surface of the second diffusion plate, and pluralities of fourth microstructures are disposed on the incident surface of the second diffusion plate. The arrangement direction of the fourth microstructures is perpendicular to the third microstructures.

To achieve the foregoing objectives, present invention of a direct-type backlight module assembly includes pluralities of light sources, a reflector, and a diffusion plate assembly. The light sources are spatially arranged and placed inside the reflector. The diffusion plate assembly is placed on the light sources. The diffusion plate assembly includes a first diffusion plate and a second diffusion plate. The first diffusion plate has pluralities of first microstructures on its emergent surface. The first microstructures are for condensing light. The thickness of the first diffusion plate is above 0.4 mm, and the transmittance of the first diffusion plate is above 90%. The second diffusion plate is placed over or under the first diffusion plate, the thickness of the second diffusion plate is above 0.4 mm, and the transmittance of the second diffusion plate is between 50% and 90%.

In conclusion, in the present invention, the first diffusion plate is of high transmittance with microstructures, therefore is capable of replacing the conventional brightness enhancement film, and as a result the cost of the backlight module assembly can be reduced.

The foregoing, features and advantages of the invention will be more readily apparent from the following detailed description, which proceeds with reference to the accompanying drawings. The drawings are not made to the scale, and are for reference only.

BRIEF DESCRIPTION OF THE DRAWINGS

FIG. 5A is a front view, FIG. 5B is a side view; FIG. 6A is a front view, FIG. 6B is a side view.

DESCRIPTION OF THE PREFERRED EMBODIMENTS

Figure 1:
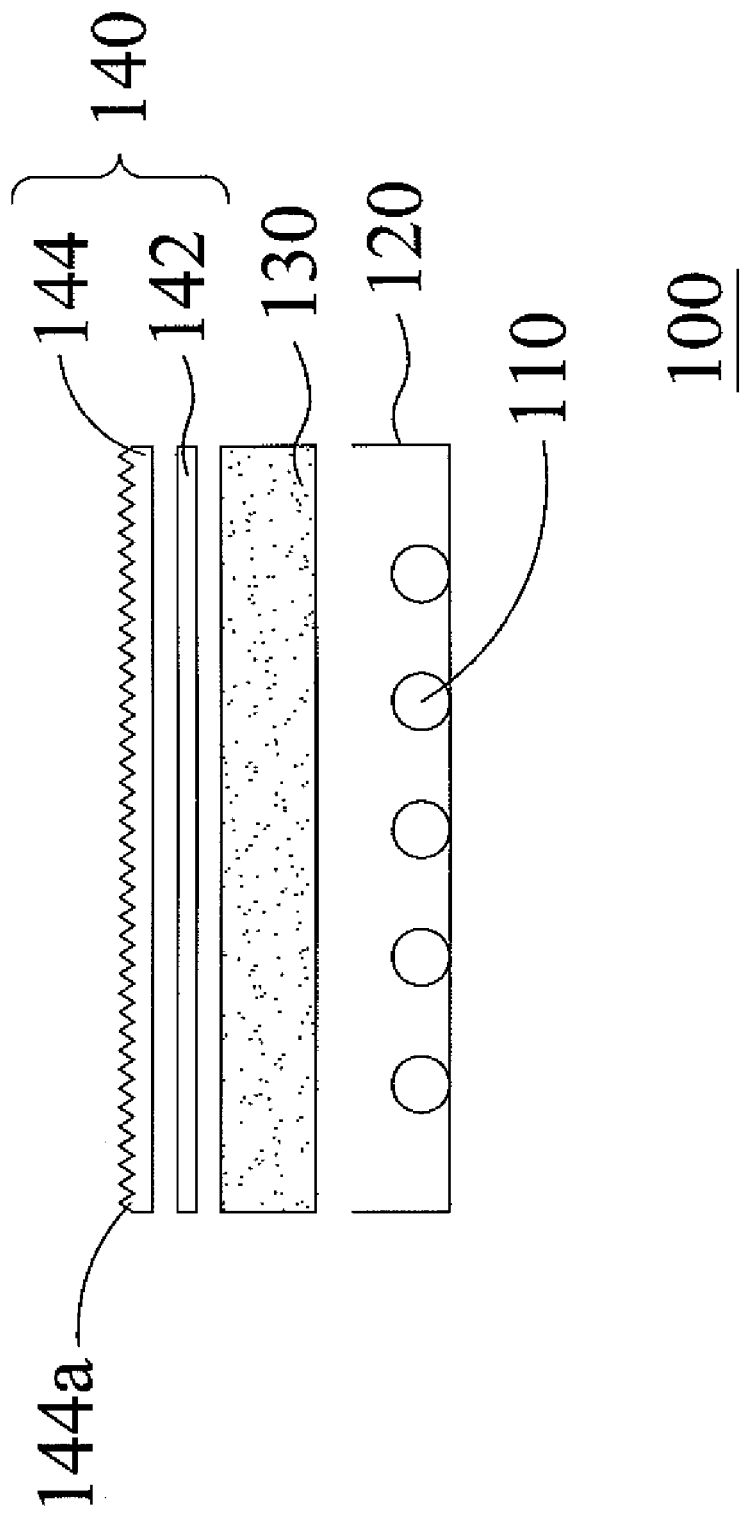
FIG. 1 shows a conventional backlight module assembly.
Figure 2:
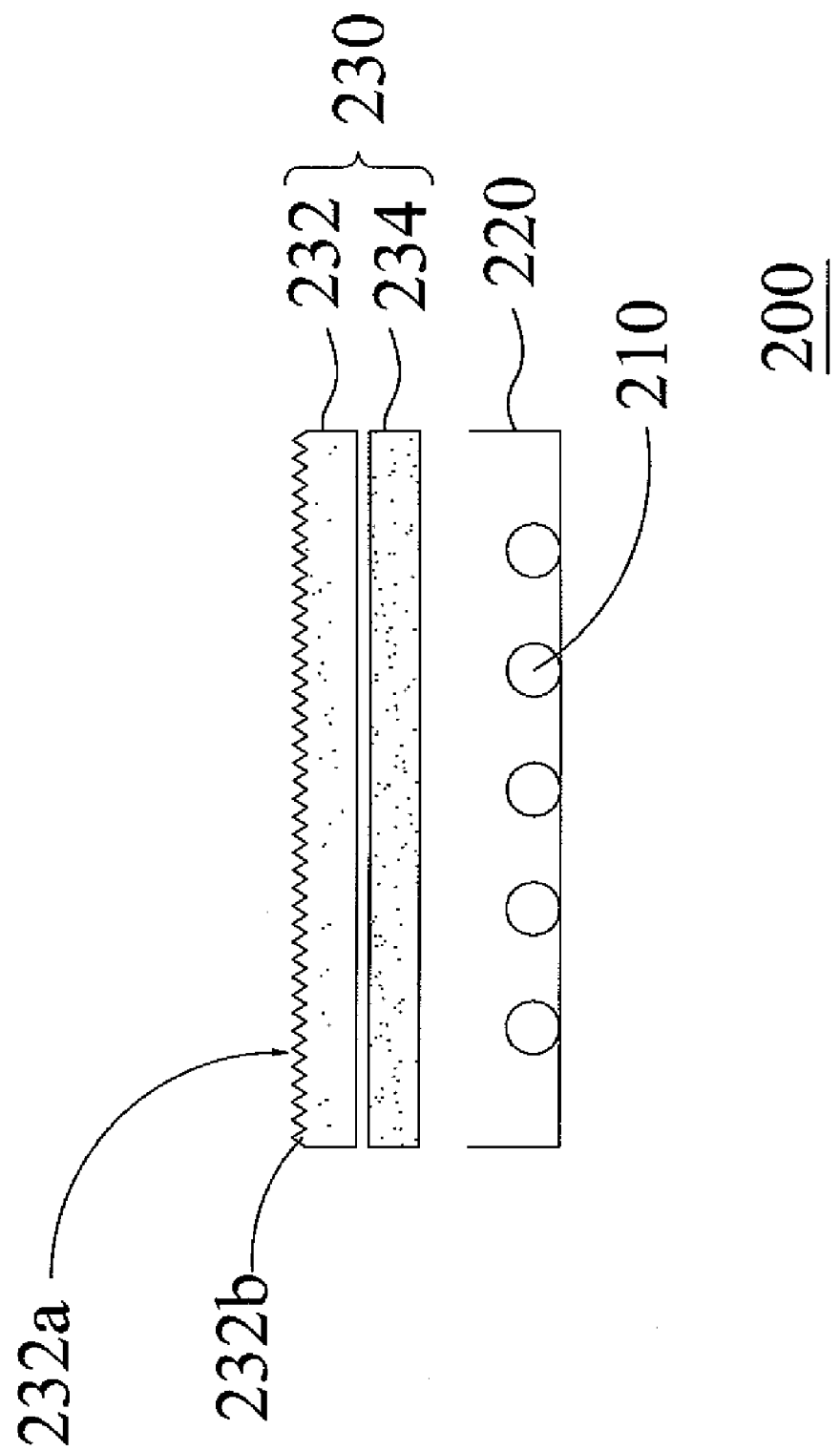
FIG. 2 shows a first embodiment of the backlight module assembly.

Referring to FIG. 2, FIG. 2 shows a first embodiment of a backlight module assembly. The backlight module assembly 200 includes light sources 210, a reflector 220, and a diffusion plate assembly 230. The light sources 210 are spatially arranged cold cathode fluorescent lamps or an array of light emitting diodes. The reflector 220 is used to guide the light, emitting from the light sources 210, towards the diffusion plate assembly.

Figure 3:
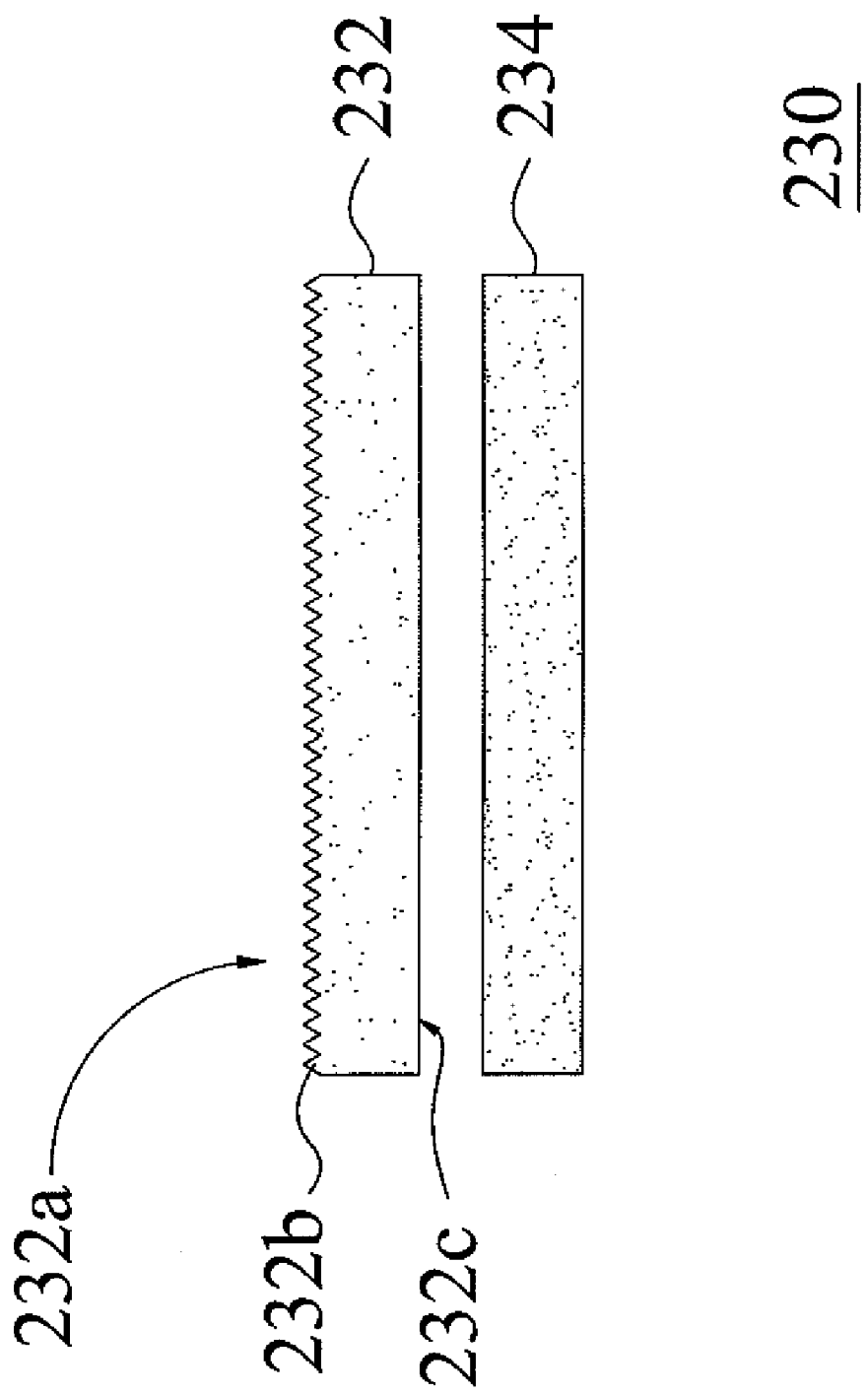
FIG. 3 shows the diffusion plate assembly depicted in FIG. 2.

Referring to FIG. 3, FIG. 3 shows the diffusion plate assembly depicted in FIG. 2. The diffusion plate set 230 includes a first diffusion plate 232 and a second diffusion plate 234. The first diffusion plate 232 has pluralities of first microstructures 232b on its emergent surface 232a. The second diffusion plate 234 is placed under the first diffusion plate 232. Since the second diffusion plate 234 has more optical diffusion particles, the transmittance of the second diffusion plate 234 is lower than the first diffusion plate 232. The transmittance of the second diffusion plate 234 is between 50% and 90%, and preferred between 50% and 55%. The transmittance of the first diffusion plate 232 is above 90%, and preferred above 95%.

The first diffusion plate 232 and the second diffusion plate 234 are mainly comprised of transparent material doped with pluralities of optical diffusion particles. The refractive index of optical diffusion particles is different from said transparent material, so the light will be refracted or reflected when passing the boundary of optical diffusion particles and said transparent material. Accordingly, the light will be diffused when passing through the first diffusion plate 232 and the second diffusion plate 234. Said transparent material may be Polymethy Methacrylane, Polycarbonate, Polystyrene, (Methyl Methacrylate) Styrene, Polypropane, Polyethylene, and Polyethylene terephthalate. In the preferred embodiment, the transparent material is (Methyl Methacrylate) Styrene.

The transmittance of the first diffusion plate 232 and the second diffusion plate 234 can be controlled by adjusting the concentration of the optical diffusion particles. The transmittance of diffusion plate is lower when the concentration of the optical diffusion particles is increased. Therefore, the concentration of the optical diffusion particles in the first diffusion plate 232 is lower than in the second diffusion plate 234. In this embodiment, the optical measurement device, whose serial number is NDH 2000, provided by KEISOKU GIKEN is used to measure the transmittance of the first diffusion plate 232 and the second diffusion plate 234. The first diffusion plate 232 and the second diffusion plate 234 can be manufactured by extruding method.

The thickness of the first diffusion plate 232 and the second diffusion plate 234 are both above 0.4 mm, preferred between 0.4 mm and 2 mm. In the more preferred embodiment, the thickness of the first diffusion plate 232 is 0.6 mm, and the thickness of the second diffusion plate 234 is 1.5 mm.

Figure 4:
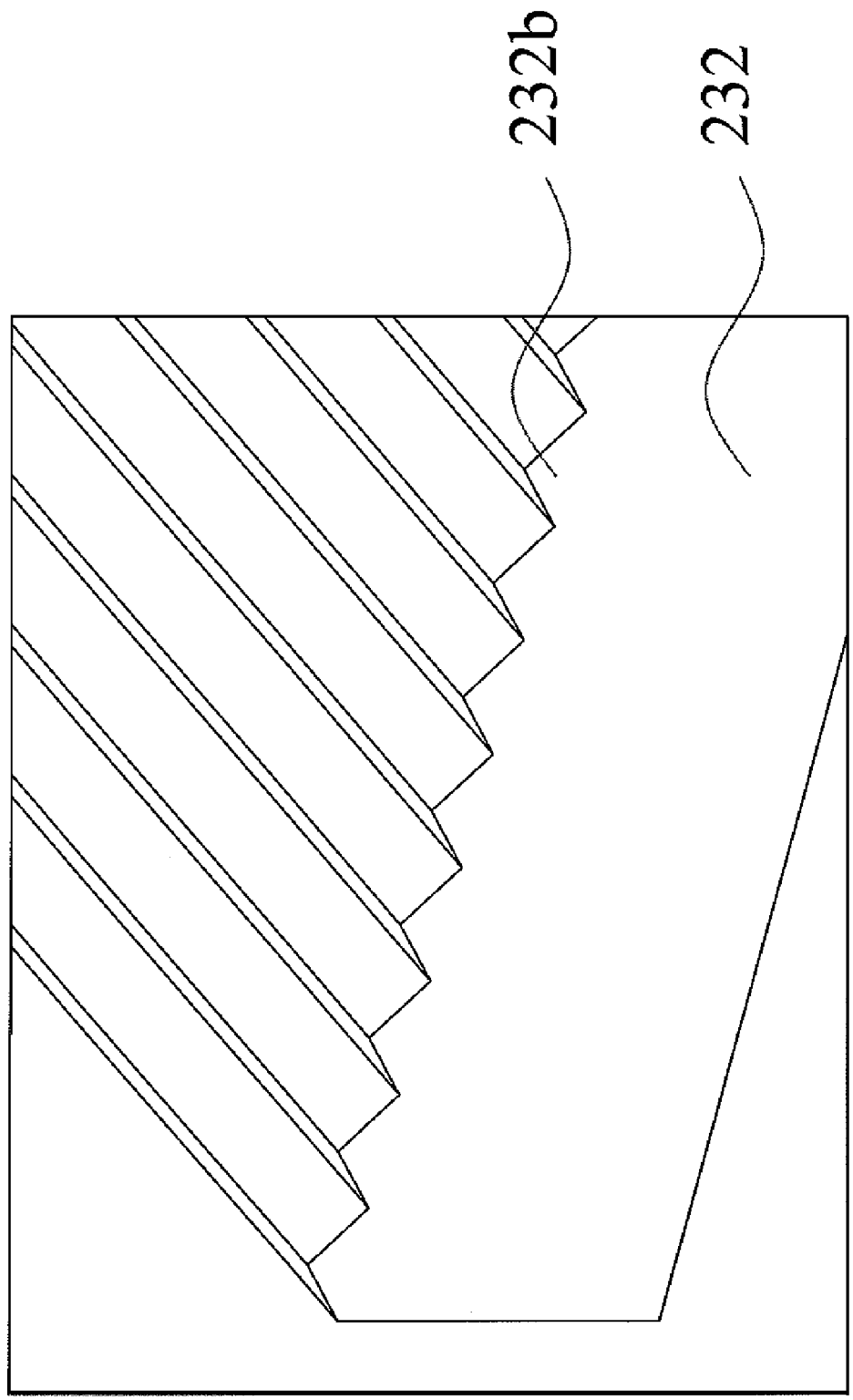
FIG. 4 shows a partial perspective view of the first diffusion plate.

Referring to FIG. 3 and FIG. 4, FIG. 4 shows a partial perspective view of the first diffusion plate. Due to its prism-shaped structure, the first microstructures 232b can condense the light. The height of the first microstructures 232b is between 25 µm and 200 µm, and the distance between the peaks of each first microstructure 232b is between 50 µm and 300 µm. The skill in the art can design the first microstructure 232b as other shape, for example: cone, lenticular, pyramid or hemisphere shape, to condense the light.

Since the first diffusion plate 232 can enhance brightness, the backlight module assembly 200 can be designed to exclude the brightness enhancement film 144.

Besides the second diffusion plate 234 has light-diffusion effect, the clearances (not shown) between the first diffusion plate 232 and the second diffusion plate 234 also have light-diffusion effect, the reason is that the light will be refracted or reflected when passing through these clearances. Compared to brightness enhancement film 144, the first diffusion plate 232 is thicker, so the path of the light to pass through is longer. This further enhances the light-diffusion effect. Therefore, the backlight module assembly 200 will not need the diffusion film 142, lowering the cost in whole.

Currently on the market, the cost for one diffusion films 142, one brightness enhancing film 144 and diffusion plate 130 is approximately $20. The cost of diffusion plate assembly 230 is approximately $10. Due to the volatile nature of prices of optical films and diffusion plate, the above is only to reflect the current market value. Notwithstanding, the diffusion plate assembly 230 can save around 50% of the price as compared to a conventional diffusion plate assembly.

In the first embodiment, the microstructures, i.e. the first microstructures 232b, is only disposed on the emergent surfaces 232b of the first diffusion plate 232. But the skill in the art can also dispose the microstructures on the incident surface 232c of the first diffusion plate 232 or on the second diffusion plate 234, as to be explained below.

Figure 5A:
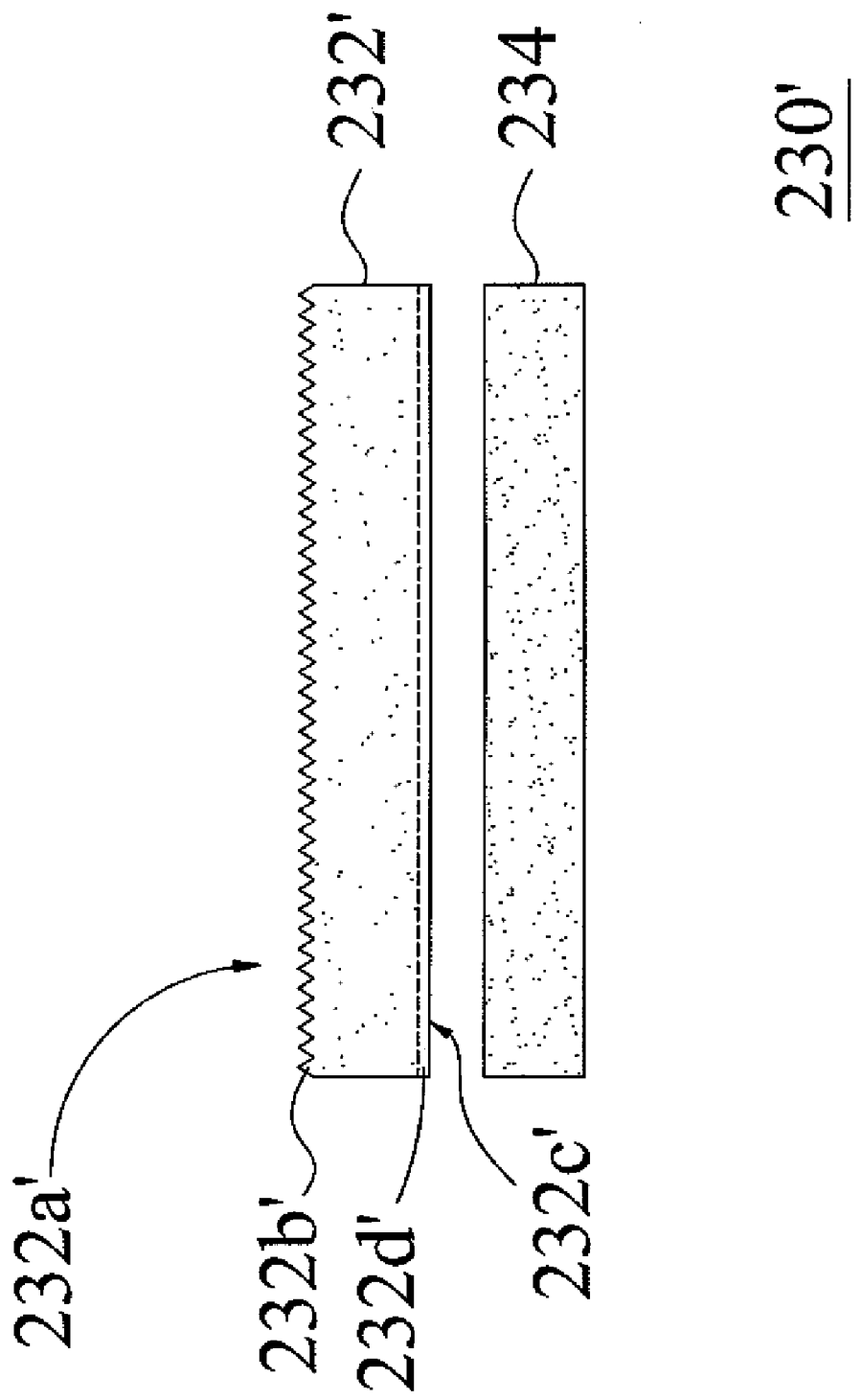
FIG. 5A and FIG. 5B show a second embodiment of the diffusion plate assembly.
Figure 5B:
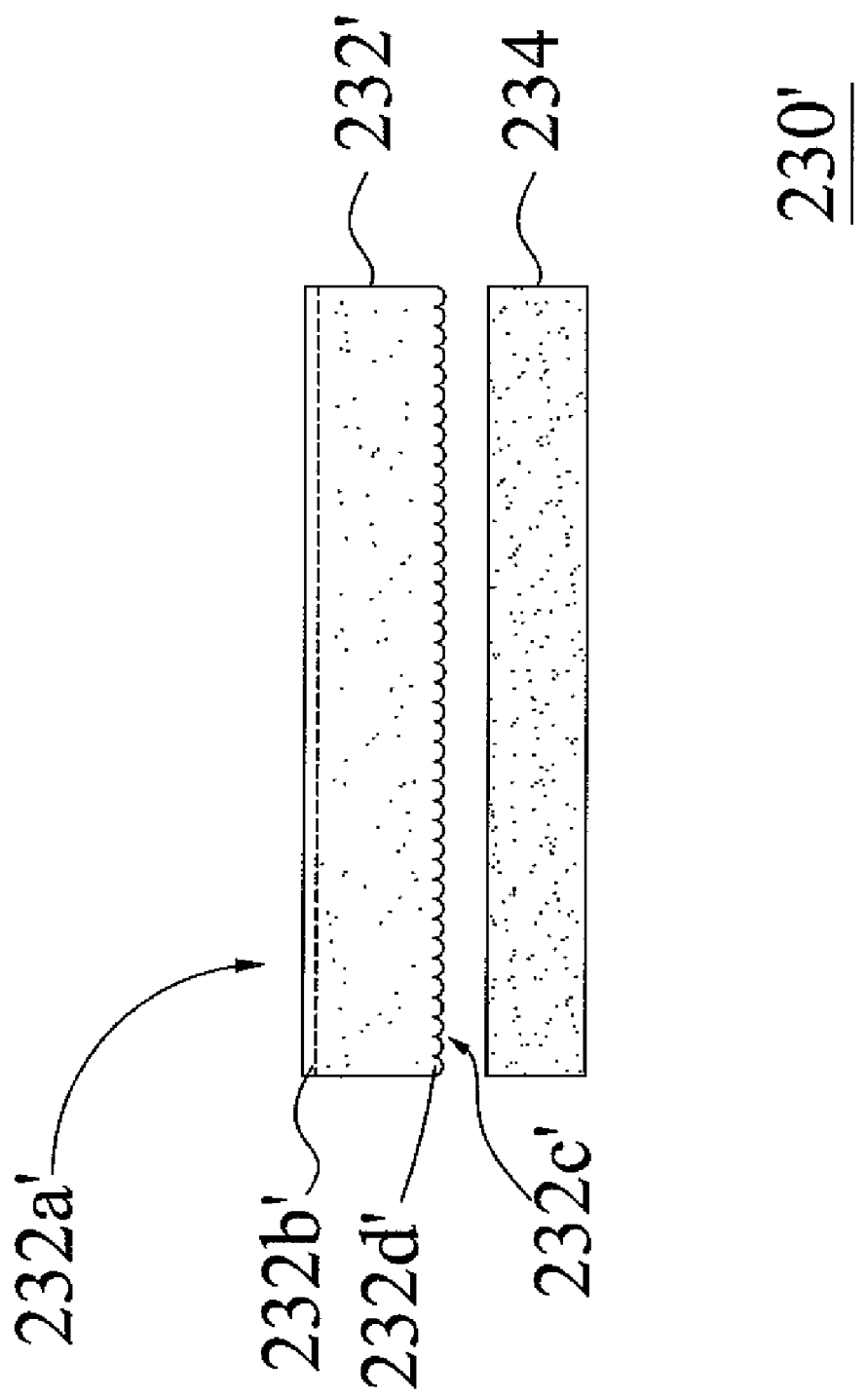

Referring to FIG. 5A and FIG. 5B, FIG. 5A and FIG. 5B show a second embodiment of the diffusion plate assembly. FIG. 5A is a front view, FIG. 5B is a side view. The diffusion plate assembly 230' is comprised of a first diffusion plate 232' and a second diffusion plate 234, pluralities of first microstructures 232b' and pluralities of second microstructures 232d' are respectively disposed on the emergent surface 232a' and the incident surface 232c' of the first diffusion plate 232'. The arrangement direction of the second microstructures 232d' is perpendicular to the first microstructures 232b'.

Figure 6A:
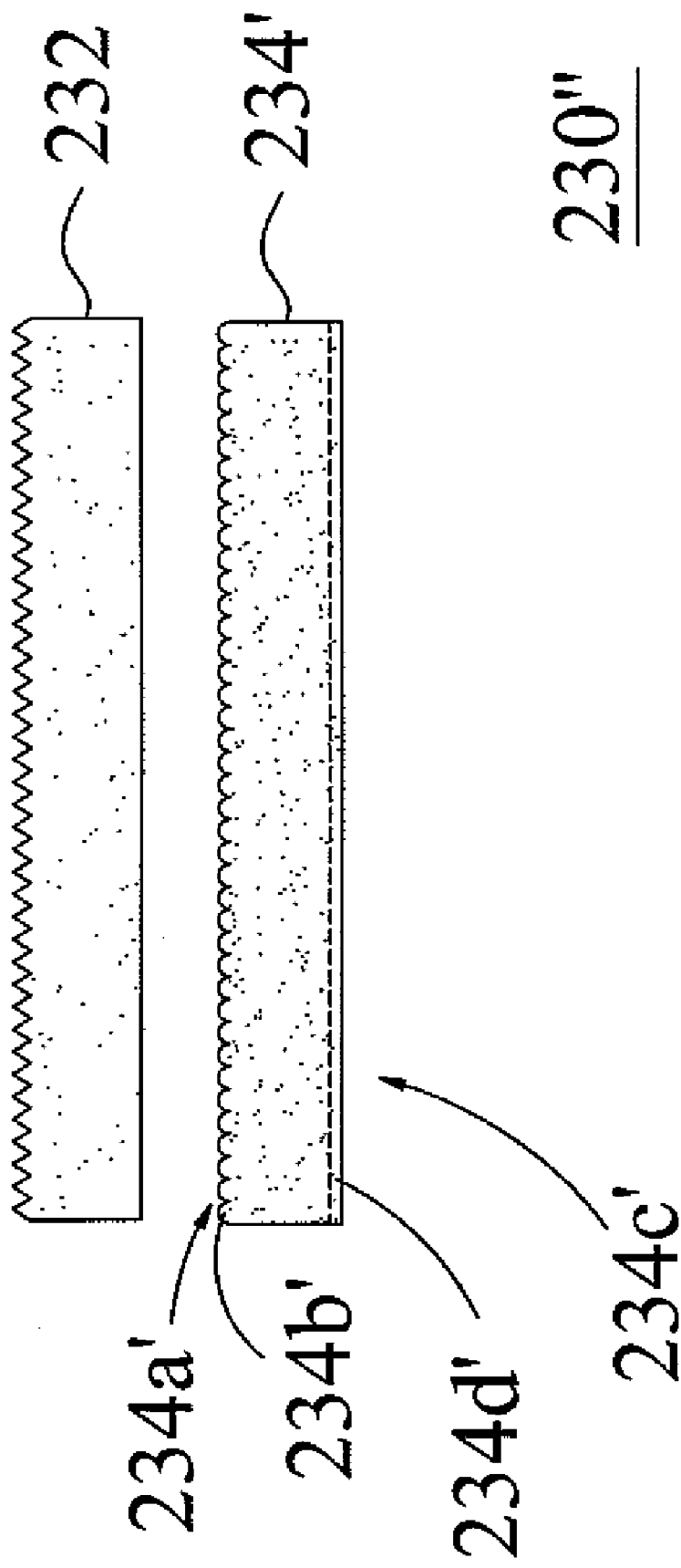
FIG. 6A and FIG. 6B show a third embodiment of the diffusion plate assembly.
Figure 6B:
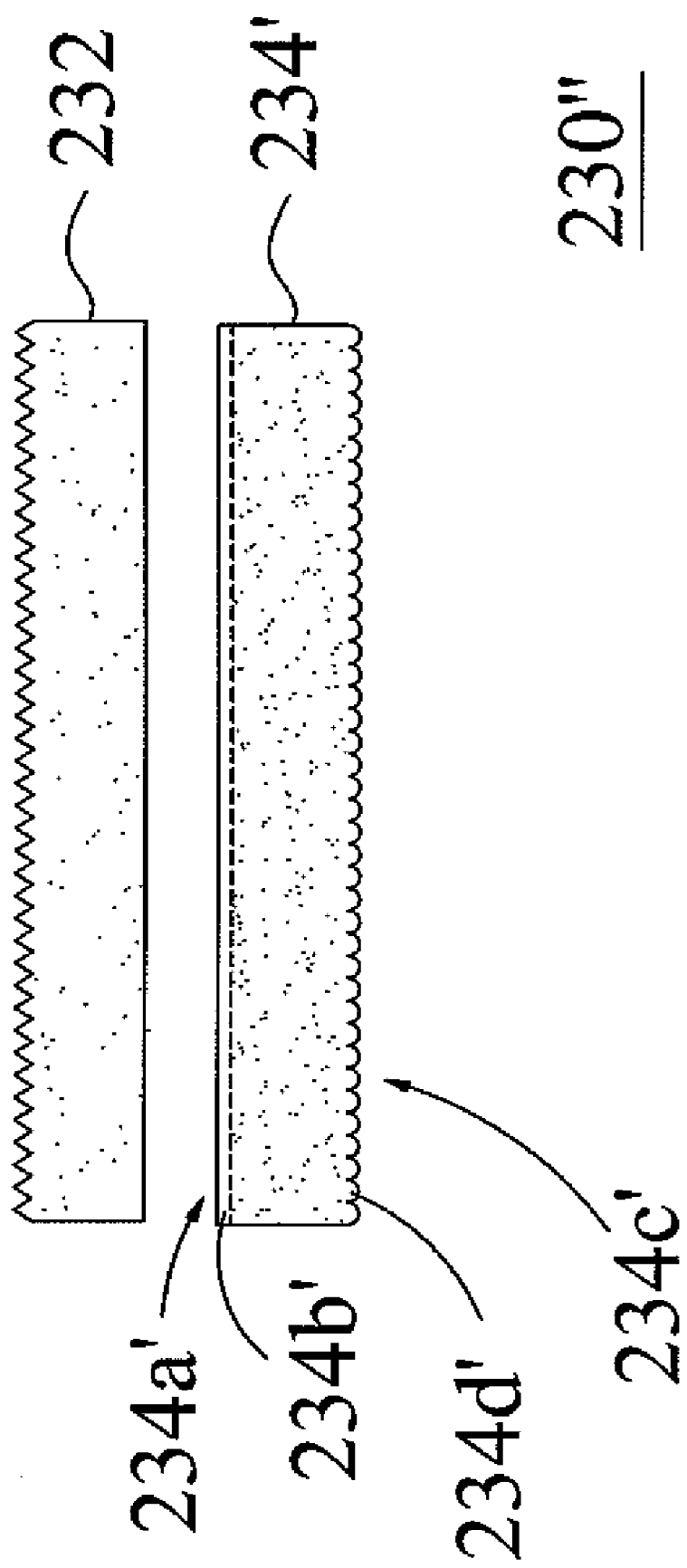

Referring to FIG. 6A and FIG. 6B, FIG. 6A and FIG. 6B show a third embodiment of the diffusion plate assembly. FIG. 6A is a front view, FIG. 6B is a side view. The diffusion plate assembly 230" is comprised of the first diffusion plate 232 and the second diffusion plate 234', pluralities of third microstructures 234b' and pluralities of fourth microstructures 234d' are respectively disposed on the emergent surface 234a' and the incident surface 234c' of the second diffusion plate 234'. The arrangement direction of the fourth microstructures 234d' is perpendicular to the third microstructures 234b'. In consideration of cost, the fourth microstructures 234d' may be excluded. In the diffusion plate assembly 230' and the diffusion plate assembly 230", the number of time the light can be refracted or reflected is increased by the second microstructures 232b', the third microstructures 234b', and the fourth microstructures 234d', so the light-diffusion effect can be enhanced in the diffusion plate assemblies 230' and 230".

In above embodiments, the second diffusion plate is placed under the first diffusion plate, but the skill in the art can place the second diffusion plate over the first diffusion plate in accordance with the situation. If the second diffusion plate is placed over the first diffusion plate, the brightness of the backlight assembly will be more uniform.

While the preferred embodiment of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

We claim:

1. A diffusion plate set, comprising:
   a first diffusion plate having pluralities of first microstructures on its emergent surface, the first microstructures are for condensing light, the thickness of the first diffusion plate is above 0.4 mm, and the transmittance of the first diffusion plate is above 90%; and
   a second diffusion plate which is placed over or under the first diffusion plate, the thickness of the second diffusion plate is above 0.4 mm, and the transmittance of the second diffusion plate is between 50% and 90%.

2. The diffusion plate assembly recited in claim 1, wherein the first microstructures are prism-shaped microstructures.

3. The diffusion plate assembly recited in claim 1, wherein the height of the first microstructures is between 25 μm and 200 μm, and the distance between the peaks of each first microstructure is between 50 μm and 300 μm.

4. The diffusion plate assembly recited in claim 1, wherein the first diffusion plate and the second diffusion plate are comprised of transparent material doped with pluralities of optical diffusion particles; wherein the transparent material is selected from the group consisting of Polymethy Methacrylane, Polycarbonate, Polystyrene, (Methyl Methacrylate) Styrene, Polypropane, Polyethylene, and Polyethylene terephthalate.

5. The diffusion plate assembly recited in claim 1, wherein the transmittance of the second diffusion plate is between 50% and 55%.

6. The diffusion plate assembly recited in claim 1, wherein the transmittance of the first diffusion plate is above 95%.

7. The diffusion plate assembly recited in claim 1, wherein the thickness of the first diffusion plate is between 0.4 mm and 2 mm, and the thickness of the second diffusion plate is between 0.4 mm and 2 mm.

8. The diffusion plate assembly recited in claim 7, wherein the thickness of the first diffusion plate is 0.6 mm, and the thickness of the second diffusion plate is 1.5 mm.

9. The diffusion plate assembly recited in claim 1, wherein pluralities of second microstructures are disposed on the incident surface of the first diffusion plate.

10. The diffusion plate assembly recited in claim 1, wherein pluralities of third microstructures are disposed on the emergent surface of the second diffusion plate.

11. The diffusion plate assembly recited in claim 10, wherein pluralities of fourth microstructures are disposed on the incident surface of the second diffusion plate, and the arrangement direction of the fourth microstructures is perpendicular to the third microstructures.

12. A direct-type backlight module assembly, comprising:
    pluralities of light sources, spatially arranged;
    a reflector, the light sources are placed inside the reflector;
    a diffusion plate assembly, placed on the light source, comprising a first diffusion plate and a second diffusion plate, the first diffusion plate having pluralities of first microstructures on its emergent surface, the first microstructures are for condensing light, the thickness of the first diffusion plate is above 0.4 mm, and the transmittance of the first diffusion plate is above 90%; the second diffusion plate which is placed over or under the first diffusion plate, the thickness of the second diffusion plate is above 0.4 mm, and the transmittance of the second diffusion plate is between 50% and 90%.

13. The direct-type backlight module assembly recited in claim 12, wherein the first microstructures are prism-shaped microstructures.

14. The direct-type backlight module assembly recited in claim 12, wherein the height of the first microstructures is between 25 μm and 200 μm, and the distance between the peaks of each first microstructure is between 50 μm and 300 μm.

15. The direct-type backlight module assembly recited in claim 12, wherein the first diffusion plate and the second diffusion plate are comprised of transparent material and doped with pluralities of optical diffusion particles; wherein the transparent material is selected from the group consisting of Polymethy Methacrylane, Polycarbonate, Polystyrene, (Methyl Methacrylate) Styrene, Polypropane, Polyethylene, and Polyethylene terephthalate.

16. The direct-type backlight module assembly recited in claim 12, wherein the transmittance of the first diffusion plate is between 50% and 55%.

17. The direct-type backlight module assembly recited in claim 12, wherein the transmittance of the first diffusion plate is above 95%.

18. The direct-type backlight module assembly recited in claim 12, wherein the thickness of the first diffusion plate is between 0.4 mm and 2 mm, and the thickness of the second diffusion plate is between 0.4 mm and 2 mm.

19. The direct-type backlight module assembly recited in claim 18, wherein the thickness of the first diffusion plate is 0.6 mm, and the thickness of the second diffusion plate is 1.5 mm.

20. The direct-type backlight module assembly recited in claim 12, wherein pluralities of second microstructures are disposed on the incident surface of the first diffusion plate.

21. The direct-type backlight module assembly recited in claim 12, wherein pluralities of third microstructures are disposed on the emergent surface of the second diffusion plate.

22. The direct-type backlight module assembly recited in claim 21, wherein pluralities of fourth microstructures are disposed on the incident surface of the second diffusion plate, and the arrangement direction of the fourth microstructures is perpendicular to the third microstructures.

* * * * *